(12) United States Patent
Schinkel et al.

(10) Patent No.: US 11,136,226 B2
(45) Date of Patent: Oct. 5, 2021

(54) APPARATUS COMPRISING A PIVOTABLE ARM AND A CONFIGURABLE SPRING

(71) Applicant: NHLO HOLDING B.V., Utrecht (NL)

(72) Inventors: Edouard Frans Alexander Schinkel, Amsterdam (NL); Michaël Hubert Schinkel, Amsterdam (NL)

(73) Assignee: NHLO HOLDING B.V., Utrecht (NL)

( * ) Notice: Subject to any disclaimer, the term of this patent is extended or adjusted under 35 U.S.C. 154(b) by 123 days.

(21) Appl. No.: 16/090,310

(22) PCT Filed: Mar. 31, 2017

(86) PCT No.: PCT/EP2017/057689
§ 371 (c)(1),
(2) Date: Oct. 1, 2018

(87) PCT Pub. No.: WO2017/167962
PCT Pub. Date: Oct. 5, 2017

(65) Prior Publication Data
US 2019/0112166 A1    Apr. 18, 2019

(30) Foreign Application Priority Data

Mar. 31, 2016   (NL) .................................... 2016520

(51) Int. Cl.
*B66C 13/14* (2006.01)
*B66C 13/02* (2006.01)
(Continued)

(52) U.S. Cl.
CPC .............. *B66C 13/14* (2013.01); *B66C 13/02* (2013.01); *B66C 25/00* (2013.01); *F16F 9/44* (2013.01);
(Continued)

(58) Field of Classification Search
CPC . B63B 2017/0072; B66C 13/14; B66C 13/02; B66C 25/00; B66C 2700/0321;
(Continued)

(56) References Cited

U.S. PATENT DOCUMENTS 3,811,637 A * 5/1974 Abler ................... B65H 23/063
242/421.7
3,841,605 A * 10/1974 Joraku .................. B66C 23/005
254/127

(Continued)

FOREIGN PATENT DOCUMENTS

| FR | 2669381 A1 | 5/1992 |
| WO | 2007/034096 A1 | 3/2007 |
| WO | 2011/154730 A1 | 12/2011 |

OTHER PUBLICATIONS

International Search Report and Written Opinion for PCT/EP2017/057689 dated Apr. 7, 2017.
(Continued)

*Primary Examiner* — Michael E Gallion
(74) *Attorney, Agent, or Firm* — David P. Owen

(57) ABSTRACT

Method and device (1) for lifting loads (7). An arm (2) that is the load or that supports a load (7) is pivotably connected to a reference. The load results in a torque. At least a part of the counter-torque to result in a system supporting the load is provided by a gas or hydro-pneumatic spring (60).

14 Claims, 7 Drawing Sheets

(51) Int. Cl.
   *B66C 25/00* (2006.01)
   *F16F 9/44* (2006.01)
   *F16F 9/54* (2006.01)
   *B63B 17/00* (2006.01)

(52) U.S. Cl.
   CPC ........ *F16F 9/54* (2013.01); *B63B 2017/0072* (2013.01); *B66C 2700/0321* (2013.01); *B66C 2700/06* (2013.01); *F16F 2222/12* (2013.01); *F16F 2232/08* (2013.01); *F16F 2234/02* (2013.01); *F16F 2238/04* (2013.01)

(58) Field of Classification Search
   CPC ...... B66C 2700/06; B66C 23/005; F16F 9/44; F16F 9/54; F16F 2222/12; F16F 2232/08; F16F 2234/02; F16F 2238/04; B25H 1/0028
   See application file for complete search history.

(56) References Cited

U.S. PATENT DOCUMENTS

| | | | | |
|---|---|---|---|---|
| 5,784,740 | A * | 7/1998 | DiSieno | B65G 69/2841 14/71.3 |
| 6,899,308 | B2 * | 5/2005 | Chow | F16F 15/28 248/282.1 |
| 10,604,216 | B2 * | 3/2020 | Schinkel | B63B 27/10 |
| 2012/0186380 | A1 * | 7/2012 | Yamada | F15B 7/02 74/490.01 |
| 2015/0338019 | A1 * | 11/2015 | Schinkel | F16M 11/425 248/550 |
| 2017/0305507 | A1 * | 10/2017 | Schinkel | B63B 27/14 |

OTHER PUBLICATIONS

International Preliminary Report on Patentability for PCT/EP2017/057689 dated Oct. 11, 2018.

* cited by examiner

APPARATUS COMPRISING A PIVOTABLE ARM AND A CONFIGURABLE SPRING

TECHNICAL FIELD

The invention relates to an apparatus and a method for lifting a load, preferably a variable load. The invention has a wide range of application, and particularly relates to offshore applications.

BACKGROUND OF THE INVENTION

In various fields, it is known to use an arm and an actuator for carrying a significant heavy load, such as 1000 Kg or more. In the field of off-shore applications, there is a need for carrying heavy loads. Huge loads, even more than 10.000 Kg, are heaved by actuators. Examples in other fields include lifting a road bridge or a rail bridge.

A further example is an access bridge from a floating object (e.g. a ship) is stabilized during movements caused by waves. Such continuous motions demand a large amount of work from the actuators. When the floating object moves, the actuator moves the access bridge, so that the (part of the) access bridge does not move from the point-of-view of the people who stands on the (part of the) access bridge. Another example of an off-shore application is lifting the load into or out from the water. The heaving apparatus may be located on-shore, while compensating for floating object movements. Also outside of the off-shore field, applications are known in which, although the load may not be over 5000 kg, continuous or intermittent work is needed for heaving/lifting/suspending/pulling. In below 'carrying' will be used to refer to any lifting/heaving/suspending/pulling action.

In all these cases, the actuator requires a considerable output force to balance the load force at a plurality of positions of the arm, thus consumes a considerable amount of energy.

It is known to lift small loads with coil spring-balanced systems. In such systems, a mechanical spring is provided to balance an arm in multiple positions. An example is a lamp which can be adjusted to different angles. The spring force generates a substantially the same amount of counter-torque to balance the torque generated by the load, so the system does not require an active force output (such as from an actuator). However, such a spring balance system is unsuitable for carrying a heavy load for two reasons. First, the properties of mechanical springs has an limit to the load to be balanced. These springs are not capable for balance a heavy weight. Second, the spring constant of mechanical springs are fixed, so it is often difficult to adjust the system to balance different loads. This puts limits on off-shore and other relevant applications.

SUMMARY OF THE INVENTION

It is therefore an object of the invention to provide a more efficient apparatus and method for carrying a heavy load.

Gas or hydro-pneumatic springs are more flexible than mechanical springs, as they are more easily adjustable. These springs are also capable for providing a considerable amount of force. However, these springs are known as unsuitable for bringing balance to a plurality of positions of an arm due to its non-linear extension force relation. Thus, gas springs are not found in the relevant fields, such as in applications for balancing large loads.

Nevertheless, the inventors recognized that characteristics of the gas spring in general and the disadvantage of the non-linearity of gas or hydro-pneumatic springs specifically can in fact be turned into an advantage. In embodiments a perfect balance is not necessary. Embodiments use the gas or hydro-pneumatic spring in an apparatus that is configured to approximate a spring-balanced system. In embodiments the non-linearity of gas or hydro-pneumatic springs is counteracted. It turns out a gas or hydro-pneumatic spring can bring very substantial balance to a plurality of positions of an arm. In embodiments use is made of means to adjust the balancing force to another level or magnitude by changing the characteristics of the gas spring. It turns out the adjustable gas or hydro-pneumatic spring is suitable for a much wider range of applications, such as in a situation where different loads need to be carried. In embodiments the non-linear extension force relation turns out to be suitable for a specific range of applications, such as in the situation where the load varies at different angles.

A first aspect of the invention relates to an apparatus according to claim 1. A second aspect of the invention relates to a method according to claim 13.

The first arm may be a beam or rigid rod, arranged to be pivoted at the pivot point (e.g. a hinge or so-called fulcrum). The pivot point may be arranged on frame, the frame being mounted on a moveable object such as a ship or a boat. The first arm can be rotate over an angle. A second state of the arm is a rotated state over at least 10 degrees with respect to an initial first state. Embodiments of the invention relate to an arm of at least 0.5 m, preferably at least 1.5 m, more preferably at least 2 m. In embodiments the arm is at least 2 m, at least 3 m or even at least 4 m long.

The first arm can be arranged to carry a load force. It may physically carry the load, directly on the arm or through a wire, or receive the load force indirectly, such as from a second arm which physically carries the load. Multiple loads can be carried. Part of the load can come from the mass of the arm. In some cases, the arm and the load are integrated, such as a bridge to be lifted. The load force is typically gravity, but may also include other types of forces. In this application, the unit 'Kg' refers to a unit of force rather than a unit of mass, i.e. 1 kilogram-force=9.8 N. Some aspects of the inventions relate to lifting a load of at least 9800 N, preferably at least 19600 N, more preferably at least 27 kN, even more preferably 46 kN.

Carrying the load force results in a torque. The load applies a load force to the arm and contributes to a substantial part of the torque. The arm itself and other factors may also generate some torques. In this applications, these torques are considered as components of the torque to be countered. The torque can be clockwise or counter-clockwise. The direction of the torque is defined by the force applied by the external load on the arm. The counter-torque is in the opposite direction. Some aspects of the inventions relate to lifting a at least 30 kNm, preferably at least 60 kNm, more preferably at least 90 kNm, even more preferably 150 kNm or more. In this application active torque (or counter-torque) refers to torques generated by the actuator and/or the gas or hydro-pneumatic spring and/or other configurable devices. In this application passive torque (or counter-torque) refers to torques generated by the mass of the arm, the load or load force, and all other relevant factors such inertia, friction, wind, rain etcetera, to be countered by the active torques or counter-torques in order to achieve balance and/or in order to move the arm. Generally the net passive torques is positive. Those net torques around the pivot point are to be countered and balanced by the net active torques.

The gas or hydro-pneumatic spring is arranged to applying a force on the arm, resulting in a counter-torque with respect to the pivot point. The gas or hydro-pneumatic spring according to the invention has an adjustable spring characteristic, which is configured to compensate at least 50% of the torque of the load force with counter-torque in the first state and second state. Preferably the gas or hydro-pneumatic spring is arranged to provide a counter torque of at least 50% of the net passive torques. Optionally, the spring characteristic can be adapted to compensate at least 50% of the (net passive) torque(s) along an entire movement from the first state to the second state. In embodiments the percentage is at least 25%. However it is preferred the percentage is at least 60%, more preferred at least 70%.

The apparatus may comprises a support or frame, such as a base fixed to a ship. In this embodiment, the gas or hydro-pneumatic spring is arranged to apply the spring force at a first point of application on the arm, and a second point of application on the support or frame. The support or frame may also (in)directly support the pivot point of the arm.

Preferably, the gas or hydro-pneumatic spring is arranged to apply the force at a first point of application on the arm, and a second point of application on the support or frame, wherein the pivot point, the first point of application and the second point of application define a triangle having an area correlated with the torque. In this way, due to the correlation between the area and the torque, the counter-torque and the torque can be brought close to balance by adjusting the spring characteristic of the gas or hydro-pneumatic spring. Adjusting the spring characteristic can comprise adjusting characteristics of the spring before the load is to be carried by the arm, during the application of the load to the arm, while the arm is held in the first state (so at an initial angle) or can be adjusting the characteristics of the spring during movement of the arm while carrying the load, e.g. during a movement from a first state to a second state.

Balance of torque and counter-torque can be achieved at one, two or multiple positions. To achieve this the spring characteristic of the gas or hydro-pneumatic spring are adjusted.

In an embodiment, the area of the triangle is proportional to a trigonometric function of the angle of the arm. In one embodiment, which will be explained in more details below, the load applies a gravitational force by its weight and the torque is of the form:

$$\tau_1 = mgl \sin \phi.$$

wherein, m is the mass of the load, g the gravitational constant, l the length of the arm and φ the angle of the arm. On the other hand, the counter-torque in this embodiment is of the form:

$$\tau_2 = F \times \frac{ar}{x} \sin \phi.$$

wherein, F is the spring force, x the length of the spring and a, r are the lengths of the other sides of the triangle.

The gas or hydro-pneumatic spring according to the invention is a configurable spring having a curved (not linear) extension-force relation, which may have a zero or non-zero free length. By configuring the spring characteristic (i.e. F/x), the counter-torque can compensate the torque in a wide range of different situations, even including the case where the load (i.e. mg) varies. Embodiments of the invention allow heaving loads in and out water or just above the bottom of the seabed or on the seabed. 'Configuring' within this application is adjusting or setting a value in accordance with a calculation, procedure, protocol, algorithm etc.

The spring characteristics is preferably adjusted at the site, although embodiments of the invention also encompass setting the spring characteristic once or at a predetermined setting. In other words, it is not necessary that the entire method of manufacturing is carried out in a factory. The adjustment of the spring characteristics may take place before each operation, or may even take place during each operation.

In this embodiment, depending on the required level of the counter-torque (depending on the force applied by the load, which depends on the mass m of the load in this example, and the trigonometric function), the spring control device can adjust the gas or hydro-pneumatic spring such that the counter-torque approaches the torque. In preferred embodiments the spring characteristic of the gas or hydro-pneumatic spring is configured such that an approximation of a Hook's law spring force is obtained, which in turn approximates the desired counter-torque.

Thanks to the counter-torque brought by the gas or hydro-pneumatic spring, it is no longer needed to rely on a big actuator to output a large amount of force. The apparatus can therefore use a much smaller actuator, which is more efficient. In some circumstances, an actuator is not needed at all. In many applications, for example lifting goods or lifting a bridge for allowing a boat to pass, the arm stays at one or both of the first position or the second position for a longer time, while transitioning between the two positions for a shorter time. In this case, it is sufficient to substantially achieve a balance at the first and second states of the apparatus. In this embodiment, the spring characteristic of the gas or hydro-pneumatic spring can be adapted to compensate at least 70%, more preferably at least 85%, of the (passive) torques in the first state and second state, so as to minimize the output of the actuator, or can even be removed. In embodiments the counter-torque is at most 150%, preferably at most 130%, more preferably at most 115% of the (passive) torque in the first and second state.

In embodiments using an actuator, it may be provided between the arm and the support/frame for providing additional torque or counter-torque. The actuator may be provided in any other direct or indirect connection to the arm, for example the actuator may be provided engaging directly on the pivot point of the arm, or engaging on a pulley connected to the arm indirectly by a wire or rope. The torque supplied by actuator can be used to attain rotational equilibrium. The actuator can also be used to bring unbalance into the system, which results into movement of the arm, e.g. heaving/lifting or placing/releasing. A suitable control device can be connected to the actuator to control it.

In an embodiment, the apparatus comprises a control device for configuring the spring characteristic of the gas or hydro-pneumatic spring.

In another embodiment, the apparatus is arranged to receive inputs from a control device for configuring the spring characteristic of the gas or hydro-pneumatic spring.

In this way, different from mechanical springs, which have a fixed spring constant and in principle can only be used to balance a specific value of a force such as a load having a specific mass, the gas or hydro-pneumatic spring of the invention can be used to bring a substantial balance against any forces, such as an apparatus for carrying variable loads.

In an embodiment, the apparatus is configured to (in-stantly) adjust the spring characteristics of the gas or hydro-pneumatic spring during operation of the apparatus. In this way, the apparatus can not only cope with a variable load but also performing other adjustments, such as gradually releasing the load. Optionally, the controller device may be integrated with the control device for the actuator. In embodiments during operation the passive torques can change, e.g. by lifting a load from water. The active torques are reconfigured accordingly during operation, wherein the counter-torque provided by the gas spring or hydro-pneumatic spring can increase or decrease, wherein preferably a spring characteristic of the gas spring or hydro-pneumatic spring can be adjusted and configured during operation.

In an embodiment, the apparatus comprises a central control unit for calculating, using an algorithm, a balancing force to be exerted by the actuator, for example taking the following into account:

Amount of load force;
Distance between load engagement connection point of load and pivot point; and/or
Properties of the pulling force device, specifically of the gas or hydro-pneumatic spring.

Thanks to the flexibility on the configuration of the gas or hydro-pneumatic spring, the invention may be used in various different applications, for example:

Apparatus suitable for carrying a fixed load, such as a scissor lift, a road bridge or a rail bridge. The bridge weight and length is taken into account to determine the load force and the corresponding torque. The spring characteristics only need an initial configuration and certain maintenance, while an adjustment during operation is not needed in this scenario;

More preferably, apparatus suitable for carrying a variable load. In this case the load force and the corresponding torque are different in different operations, so the spring characteristics are preferably adjusted before each operation. Alternatively or additionally, the area defined by the points of applications and the pivot point may be adjusted for each application by changing the position of at least one of these points. In the latter case only an initial configuration for the spring characteristics is needed, as in the case above.

Even more preferably, apparatus suitable for countering a non-constant load force, such as in applications for off-shore motion compensation. In these cases, the torques may change during operation, for example when the arm is extended and/or when the load is moved into or out from the water. For these applications, the spring characteristics can be adjusted during the operation. For example, the apparatus may be provided with a control device for adjusting the spring characteristics.

In embodiments one or more points of application of the gas or hydro-pneumatic spring are adjustable. Embodiments can comprise adjusting one or more points of application before the load is to be carried by the arm, during the application of the load to the arm, while the arm is held in the first state (so at an initial angle) or can be adjusting the position(s) during movement of the arm while carrying the load, e.g. during a movement from a first state to a second state.

In embodiments one or more points of application/engagement of the actuator are adjustable. Embodiments can comprise adjusting one or more points of application of the actuator before the load is to be carried by the arm, during the application of the load to the arm, while the arm is held in the first state (so at an initial angle) or can be adjusting the position(s) during movement of the arm while carrying the load, e.g. during a movement from a first state to a second state.

In embodiments one or more characteristic of the frame, including the length of the arm, the direction of the frame (not the arm) having the pivot point and one or more points of the application) are adjustable. In embodiments the adjustability is a result of external, non-controlled factors, such as the wind or movement of the ship on which the apparatus is mounted. E.g. the fixed pole of a frame is initially parallel to the force of gravity and due to movement of the ship, e.g. as a result of waves, the pole pivots. Embodiments can comprise adjusting one or more characteristics before the load is to be carried by the arm, during the application of the load to the arm, while the arm is held in the first state (so at an initial angle) or can comprise adjusting the characteristic(s) during movement of the arm while carrying the load, e.g. during a movement from a first state to a second state.

BRIEF DESCRIPTION OF THE DRAWINGS

Now reference will be made to the drawing as follows.

DETAILED DESCRIPTION OF EMBODIMENTS

Figure 1:
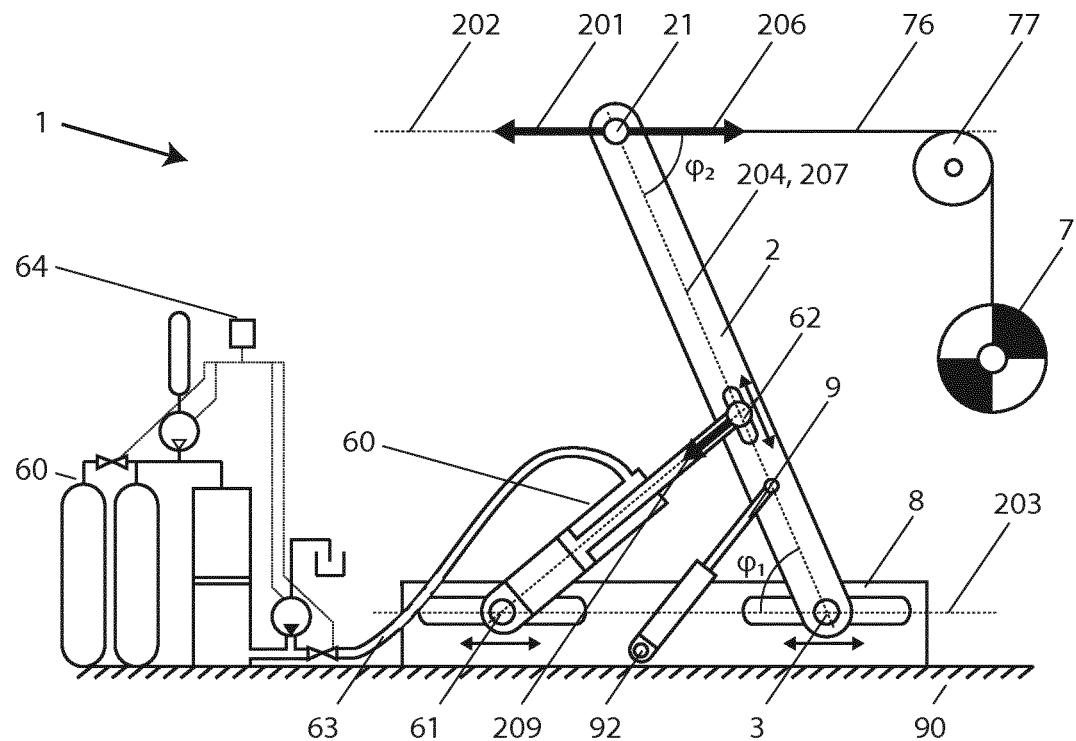
FIG. 1 shows a perspective view of a first embodiment of the apparatus according to an aspect of the invention.

FIG. 1 shows an embodiment of a device or apparatus 1 according to an aspect of the invention. The apparatus 1 is mounted on a fixation point or reference 90. In embodiments this can be the ground. However it is also possible to provide the apparatus on a moving reference, such as on a ship or in a moving object. Further the apparatus 1 comprises a support or frame 8. In the embodiment shown in FIG. 1, the support or frame 8 is fixed to the ground 90, and is positioned horizontally. These are merely for the illustration purposes. As would be understood by the skilled person, the same principle can be applied to the moving object and other directions, such as the vertical direction.

The support or frame 8 provides engagement points. One of the engagement points constitutes a pivot point 3 for a first arm 2. Another one of the engagement points 61 constitutes a point of force application for a gas or hydro-pneumatic spring 60. Further the support or frame 8 can provide an engagement point 92 for an actuator 9. More active elements can be present.

The first arm 2 is pivotably connected to support or frame 8 at pivot point 3, e.g. embodied by a bearing. FIG. 1 shows the first arm 2 positioned at an angle $\varphi_1$ with respect to a horizontal line.

Generally in this application a load 7 provides a net load force 206 that engages the first arm 2 at the load engagement point 21. The net load force 206 results in a (passive) torque around the pivot point 3.

The gas or hydro-pneumatic spring 60 has a second point of application 62 on the first arm 2. The gas or hydro-pneumatic spring 60 is arranged as pulling device. The counter-torque that provides the counter-force 201 is fully or partially supplied by a pulling force 209 of the gas or hydro-pneumatic spring 60 at point of application 62 on first arm 2. This results in a balanced system, in which the load (and the rest of the apparatus) is held in position.

For sake of simplicity the mass of the first arm 2, as well as the mass of other elements such as the gas or hydro-pneumatic spring 60, will not be considered explicitly in this application. However it will be clear that any masses (or other external factors) of the apparatus that exert a torque can be taken into account and can be balanced. E.g. in the embodiment of a vehicle bridge, the arm is formed by the load (the arm is the bridge). As explained above, the torque generated by the first arm 2 is considered as a part of the torque as a result of carrying the load 7. Further for simplicity friction is ignored, although it will be clear that in case of a large friction, the balance point of the torque system is not a point, but a level. Further for simplicity the adiabatic coefficient of a gas or hydro-pneumatic spring is ignored, although it will be clear that temperature effects are relevant in practice.

Angle

It should be noted that in this application angle, position, inclination can be used to indicate a position or state of the arm with respect to its pivot point. In embodiments, the symbol $\psi_1$ expresses the angle opposite of the gas or hydro-pneumatic spring 60 at the pivot point 3. That is, the angle between the second 203 and third 207 virtual construction lines, which are respectively the line through the pivot point 3 and the first point of application 61, and the line through the pivot point 3 and second point of application 62. The first arm 2 can rotate about the pivot point 3 by at least 10 degrees, preferably at least 15, more preferably at least 20 degrees. In an embodiment, the angle $\psi_1$ can vary between 20 and 160 degrees.

In embodiments, the symbol $\psi_2$ expresses the angle between first virtual construction line 204 (line that connects load engagement point 21 and pivot point 3) and the line 202 along the direction of both the net load force 206.

The arm of the load generated torque lies along a virtual construction line 204 where the load engages the arm. An arbitrary reference line can be chosen that corresponds to the arm at zero inclination, typically a horizontal or vertical is chosen. The inclination of the arm then expresses the angle $\psi_1$ between this fixed reference line and the first virtual the construction line 204.

In some embodiments of the invention the virtual construction lines 204 and 207 are the same line. In this case lines 203 and 202 are parallel if the angles $\psi_1$ and $\psi_2$ are equal. In preferred embodiments the center of gravity of the arm is also located on line 207 and/or 204.

In the general case, the lines 203 and 202 are said to be effectively parallel if the angles $\psi_1$ and $\psi_2$ are equal. The wording substantially parallel is used if the angles $\psi_1$ and $\psi_2$ differ by less than 15 degrees.

Torque Balance

In general the apparatus 1 is inspired on a spring-balanced system having a spring-balanced configuration. Claim 2 provides several features of such a configuration. Aspects of the invention make use of a spring-balanced configuration that is designed for an apparatus comprising an ideal spring following Hook's law. Since a gas or hydro-pneumatic spring is used, the system will not be a perfect balance at any angle, although balance can be obtained at one, two or more angles. Further the invention is not limited to a balance as a result of only the counter-torque of a spring. The invention covers devices and methods in which at least 50% (preferably at least 60%, more preferably at least 70%) of the counter-torque is provided by a spring. In accordance to certain special aspects of the invention, the apparatus 1 has a configuration that approximates a spring-balanced situation.

In the embodiment shown, the first point of application 62 is arranged on the first virtual construction line 204 between the load engagement point 21 and the pivot point 3, such that the virtual construction lines 204 and 207 are identical. The torque resulting from the load is then $$\tau_1 = mgl \sin \psi_2,$$

where m is the mass of the load, g the gravitational constant, and l is the length from the load engagement point 21 to the pivot point 3.

On the other hand, a counter-torque provided by the spring is dependent on the area of the triangle $\Delta_{ABC}$ defined by the pivot point 3 and the two points of application 61 and 62. In this embodiment, it is as follows $$\tau_2 = F \times a \sin \alpha = F \times \frac{\Delta_{ABC}}{2x} = F \times \frac{ar}{x} \sin \psi_1,$$

where a and r are the configurable distances from the first 62 respectively second 61 point of application to the pivot point 3, and x is the distance between the two points of application. Further $\alpha$ is the angle between the direction of the pulling force 209 and the first virtual construction line 204.

In the theoretical case where the spring is not the gas or hydro-pneumatic spring 60 but an ideal zero-length extension spring with spring constant k, the pulling force would be:

$$F = -kx$$

In this case, if the lines 202 and 203 are effectively parallel the x's cancel. As $\psi_1$ and $\psi_2$ are equal along all inclinations of the first arm 2, the change in the arm inclination affects the torque and the counter-torque in exactly the same way along the movement of the first arm 2. As such the counter-torque provided by the spring is proportional to the load generated torque at all inclinations of the arm.

The counter-torque provided by the spring will cancel the load generated torque at all inclinations of the arm if the spring constant k and the lengths a, r, l are configured, depending on the mass of the load m, in such a way that the following condition is satisfied:

$$mgl = kar$$

For the gas or hydro-pneumatic spring 60 as shown in FIG. 1, the above-mentioned linear force extension rule does not apply, as the value of k is not a constant. The inventors have found surprisingly, substantial balance can be achieved with a gas or hydro-pneumatic spring. In embodiments the required pressure to stabilize the load force in a state between the first and the second state of the arm is calculated. Next the gas volume is calculated (for the state in between the first and the second state of the arm) that exactly balances the load force in between the first and the second state and substantially balances the arm in the first and the second state. The (simplified) formula for calculating the gas volume leading to a substantially balanced load force is:

$$V_0 = A\sqrt{a^2 + b^2}$$

wherein A is the surface of the piston, a is the distance of the pivot point to the first point of application and is the distance between the pivot point and the second point of application.

For reasons of simplicity the formula neglects other aspects according to the invention such as the desire or requirement to slightly under or over balance a load force in different states of the arm, the possibility to exactly balance the load in two states of the arm and to substantially balance the arm in a plurality of positions of the arm, and relevant factors such as the adiabatic coefficient.

Figure 4:
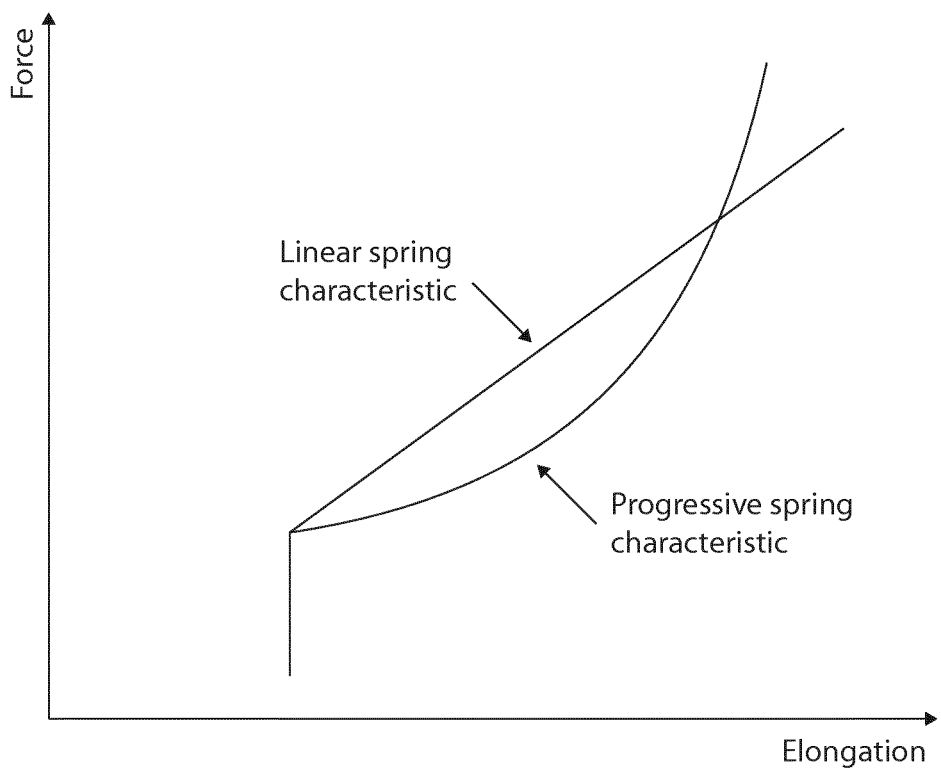
FIG. 4 shows typical spring characteristics for mechanical springs and gas or hydro-pneumatic springs.

An example of the comparison with the theoretical ideal spring is shown in FIG. 4. The straight line in FIG. 4 represents the force-to-elongation relationship of the theoretical ideal spring with a linear spring characteristic, and the curved line in FIG. 4 represents the progressive spring characteristics of the gas spring.

As explained above, the straight line representing the force of the ideal spring is equivalent to the line of the force required cancel the load generated torque. In the embodiment of FIG. 4, intersections of the progressive spring characteristic and the straight line indicate an inclinations of the arm at which the (passive/net) torque and the (active/net) counter-torque are balanced, i.e. the counter-torque compensates substantially 100% of the torque.

In any other inclination an acceleration force will be induced on the mass by the spring, in the direction of a stabilized position, proportional to the difference between the force supplied by the gas or hydro-pneumatic spring as indicated by the curved line and the force required to balance the load, as indicated by the straight line. It will be clear the force required to counteract the acceleration forces on a mass stabilized by a spring can be quite large, but the inventors found the forces required to counteract the acceleration forces in a device according to the invention can be reduced by as much as 50% or more compared to the state of the art.

Both force lines ignore practical effects such as friction, temperature effects and hysteresis, but these effects can be taken into account. E.g. as a result of friction and/or hysteresis the balance points can extend over a finite angle.

In order to reduce the resultant torque to approximately zero (in effect balancing the mass and reducing acceleration forces on the mass to zero), an additional (counter-)torque is desired on top of the torque produced by gas or hydro-pneumatic spring 60 equal to the opposite or the residual torque. In practice, in specific conditions the residual torque may be ignored. In other conditions it may be delivered by an actuator connected to the arm directly or indirectly. An actuator can provide such residual torque. Moreover the actuator can introduce a torque resulting in an unbalance, which will result in moving(heaving) the arm.

In preferred embodiments the residual torque is minimized in different optimizations, by choosing the properties of the balancing system 1 and in particular the configuration of the gas or hydro-pneumatic spring 60, according to the specific application. For example, in preferred executions the properties of the balancing device can be chosen such that the residual torque is always positive or always negative, so that the force required by the actuator for delivering the residual torque is in one direction only.

Next, several arrangements and methods will be discussed that can be used in embodiments of the invention to adjust and/or configure torques or counter-torques. Any of these embodiments can be combined with disclosed methods and any apparatus disclosed herein. In embodiments the adjustments can be made before lifting and or during lifting.

In an embodiment, the pivot point 3 can be moved in a direction parallel to the (load) force. The load force 206 generates a normal force on the pivot point 3, which in turn generates friction, which makes it difficult for the pivot point to move. However, in the direction parallel to the load force, the normal force is substantially zero, so the friction is minimum. This allows the pivot point to be moved using a minimum force, and allows the pivot point 3 to move even during operation of the apparatus. In an embodiment a drive can move the pivot point. Preferably, the drive is controllable by a central control system.

In an embodiment, the position of the first point of application on the arm can also be adjusted. In particular. the distance between the first point of application and pivoting point can be varied. Preferably, the first point of application can be configured along a line that crosses the pivot point. In an embodiment the system comprises a sliding configuration (e.g. a slit), that guides the first point of application along a predetermined line. In an embodiment a drive can move the first point of application. Preferably, the drive is controllable by a central control system.

In an embodiment, the second point of application 61 on support or frame 8 can be adjusted. In particular, the distance between second point of application 61 and pivoting point 3 can be varied. Preferably, the second point of application 61 can be configured along a line that crosses the pivot point 3. In an embodiment the system comprises a sliding configuration (e.g. comprising a slit), that guides the second point of application 61 along a predetermined direction. In an embodiment a drive can move the second point of application 61. Preferably, the drive is controllable by a central control system.

In an embodiment, the first arm 2 comprises a telescopic arrangement, e.g. comprising a guide for an extendable arm part along a direction 204. In an embodiment a drive can move the extendable arm part; preferably that drive is controllable by a central control system. When the length of first arm 2 changes, the center of its mass changes and this results in a change of the (passive) torques and thereby the desired counter-torques.

By adjusting the size of the triangle (position of the pivot point 3 and the points of applications 61,62) or the length of the arm 2, the apparatus can compensate for counter-torque differences at different angles as a result of the non-ideal gas-spring, without changing the spring characteristic in operation.

Balance Configuration and Lifting

Referring back to the embodiment of FIG. 1, the load 7 is suspended by a wire 76 over a rotating wheel 77. In embodiments, and for simplicity this will be assumed below unless otherwise indicated, the rotating wheel is at infinite distance. At not infinite distance, the direction of the load force will not be horizontal at all inclinations, resulting in $\varphi_1 \neq \varphi_2$. As a result the gravitational force of the load 7 is directed to the right. Other kinds of loads and other ways of directing the load to the arm fall within the scope of the invention.

In the embodiment shown, the actuator 9 can be configured to provide additional torque, such that the actuator torque and gas or hydro-pneumatic spring 60 torque add up to provide the desired counter-torque to balance the apparatus.

In some embodiments the actuator 9 can be configured to provide additional torque such that the total torque provided by the gas or hydro-pneumatic spring 60 and actuator 9 adds up to differ slightly from the desired counter-torque. This results in an unbalanced apparatus, resulting in load 7 being moved. As a result the load 7 can be heaved and moved, e.g. as part of a lifting device. To stop the movement, the actuator can be configured to provide a force that results in the counter-torque being balanced with the load generated torque.

In embodiments of the invention the apparatus 1 allows for a plurality of inclinations of the first arm 2 where the net torque on the arm is zero or close to zero. The components of the net torque are provided by the load 7 and at least one gas or hydro-pneumatic spring 60. Further (active) sources of torque that fall within the scope of the invention are, without limitation, any number of actuators 9 and forces due to friction.

The present invention is applicable to a situation in which the load 7 may vary. For example, the apparatus 1 may be used to carry different loads at different times. As explained above, there is also a situation where the same load varies during heaving (e.g. moving into or out from water).

In embodiments the points of engagement or applications are adjusted to configure the torque and counter-torque. In embodiments characteristics of the apparatus, such as the length of the arm and the distance of the load force to the pivot points, is adjusted. Apparatus characteristics include the virtual constructions lines of the apparatus. Any of such adjustments is illustrated below with reference to the configuration of the gas spring or hydro-pneumatic spring. However it will be understood that other variables of the apparatus can be adjusted similarly, including a configuration unit to adjust the variable as desired, e.g. by calculation.

Spring Configuration

The invention utilizes the ability of configuring the spring characteristic to cope with these situations.

The spring characteristic may be adjusted using at least the following ways:

Changing the amount of pressure fluid in the pressure fluid volume in a hydro-pneumatic spring Changing the amount of gas in the gas volume (in a gas spring or hydro-pneumatic spring);

Changing the size of the gas volume by connecting or disconnecting gas bottles (in a gas spring or hydro-pneumatic spring)

In the embodiment of FIG. 1, there is a control device 64 for adjusting the spring characteristic. The control device 64 may be either permanently or temporarily connected to the apparatus 1. When connected, the amount of oil and/or the amount of gas in the volume of the gas and/or the size of the gas volume can be adjusted and configured by the control device, for example by supplying gas into the spring.

In preferred embodiments of the system or method of the invention the system provides for hydraulic adjustment, most preferably during a heaving or releasing operation. In embodiments the amount of pressure fluid in the hydraulic volume of the hydro-pneumatic spring is changed. As a result both the (average) pressure in the gas volume and the (average) spring rate of the gas spring is altered (averages pressure and average spring rate as a result of a predefined movement of the piston causing a displacement of the gas $\Delta V$). In effect, hydraulic adjustment changes the total gas volume with respect to $\Delta V$, while maintaining the amount of gas in the gas volume equal.

The pressure and spring rate changes are not proportional. A change in the amount of oil therefore does not automatically lead to another substantially balanced situation. Analysis has shown hydraulic adjustment of the balancing device is however preferable because it can be quick, well controllable and easily reverted. More importantly analysis has shown hydraulic adjustment can lead to another substantially balanced situation for loads +/−25% compared to the original load (the load before hydraulic adjustment), and preferably +/−50% or more.

In embodiments of the system or method of the invention, pneumatic adjustment is provided. By e.g. adjusting the amount of gas in the gas volume results in a change in the (average) pressure in the gas volume and the (average) spring rate. Analysis has shown this method of adjustment is relatively slow and has some other minor deficits with respect to hydraulic adjustment.

For reasons of simplicity, it is assumed the adiabatic coefficient remains equal during this adjustment process. In that case, the change in the (average) pressure in the gas volume and the change in the (average) spring rate is proportional. Therefore a change in the magnitude of the compensation force 201 is proportional to a change in the amount of gas in the gas volume. The (simplified) formula for adjusting the magnitude of the compensation force 201 by changing the amount of gas in the gas volume is:

$$\frac{P_1}{P_2} = \frac{m_1 * l_1}{m_2 * l_2}$$

Further embodiments and methods of the invention provide pneumatic adjustment of the gas or hydro-pneumatic spring 60 by changing the volume. By adjusting the size of the gas volume the (average) pressure in the gas volume is not changed, it only changes the (average) spring rate at a predefined $\Delta V$. Adjusting the gas volume, will in general not result in a change in the magnitude of the compensation force 201. However, this method of adjustment can be preferred in certain situations such as placing a load on the seabed.

In embodiments the gas spring 60 is embodied as extension or pulling spring. In other embodiments the gas spring 60 is embodied as compression spring arranged as a pulling gas or hydro-pneumatic spring 60.

In an embodiment, the apparatus 1 is a hoisting device that substantially balances a mass with a certain weight during a first movement. During another operation a mass with another weight is hoisted in a second movement. Also a hoisting device that substantially balances the mass can be required to pickup or place the mass carefully (with low impact forces). This can be obtained by gradually adjusting the device. During pick-up the actuator 9 and/or the gas or hydro-pneumatic spring 60 (or the points of application 61,62 or position of the pivot point 3, or the length of first arm 2) are controlled such that a situation of (over)balancing the mass is obtained, which results in the load 7 being lifted from a ground surface. To release the load 7, the system 1 is controlled to slowly underbalancing the load.

A simplified embodiment showing the adjustment process includes the apparatus 1 moving along a predefined operating range (around the arm pivot 3) resulting in $\Delta V$ of the piston. The objective of the adjustment is to change the constant force substantially to another magnitude or level, substantially balancing another mass or over or underbalancing the same mass, at the same, predefined operating range of the arm system.

In any of the embodiments the spring characteristic is configured such that in two states, a first state and a second state with the arm at an angle at least 10 degrees different, at least 50% of the counter-torque is provided by the gas spring or hydro-pneumatic spring.

Translation of Virtual Construction Lines

Figure 2A:
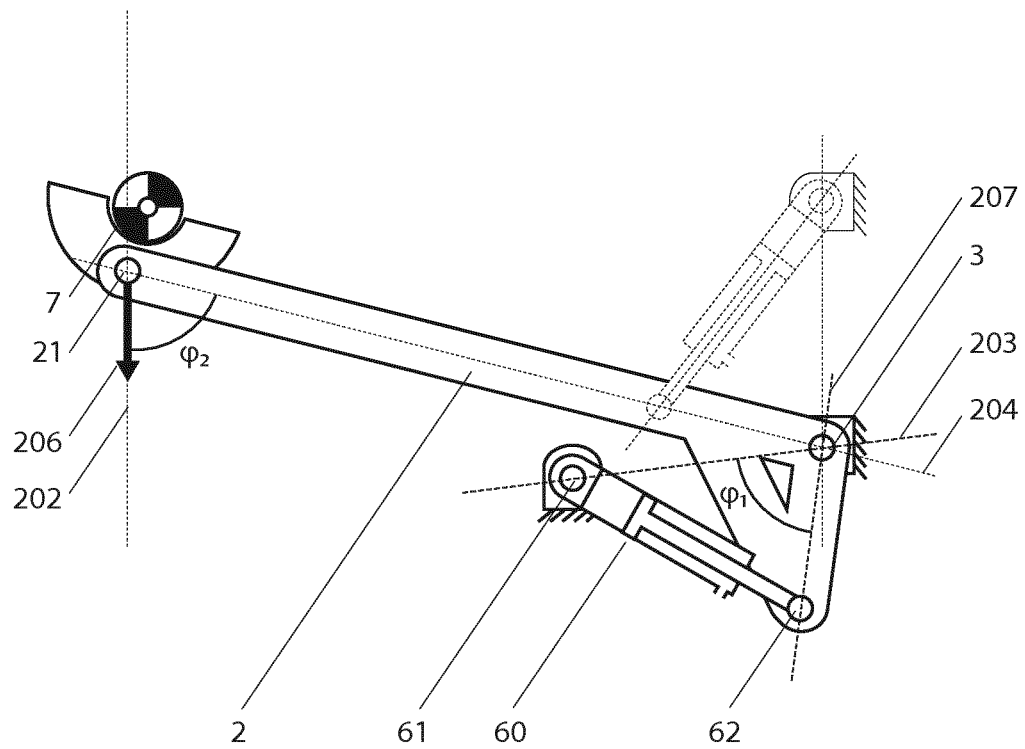
FIGS. 2a-2c show perspective views of several other embodiments of the apparatus according to an aspect of the invention.
Figure 2B:
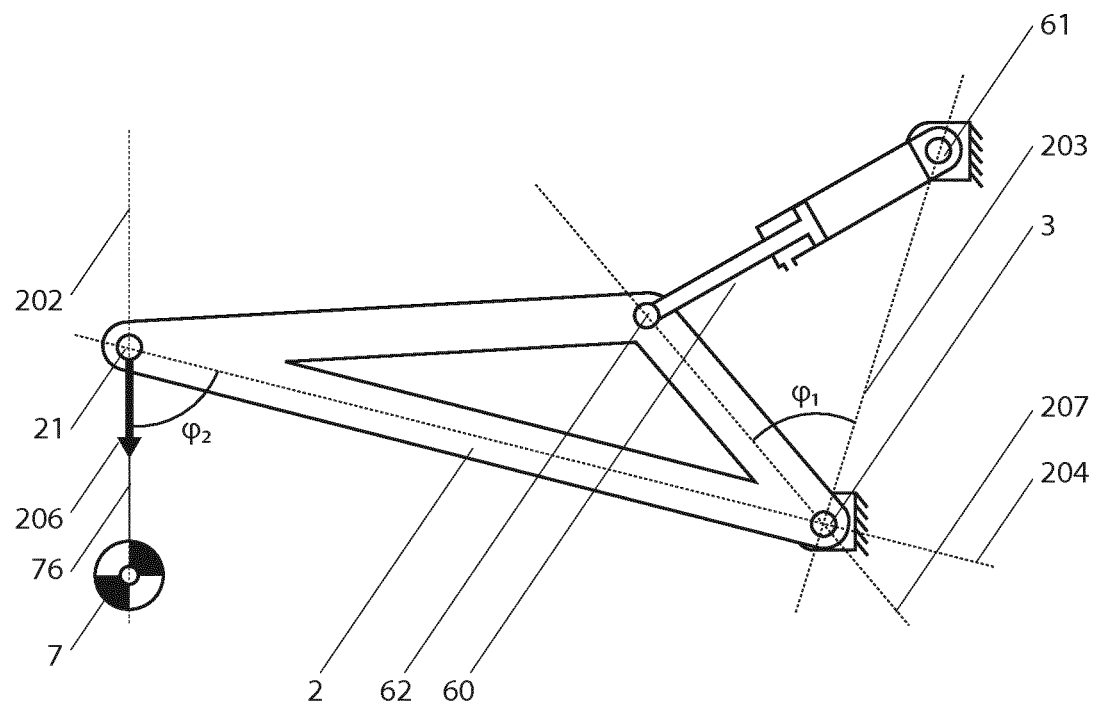
Figure 2C:
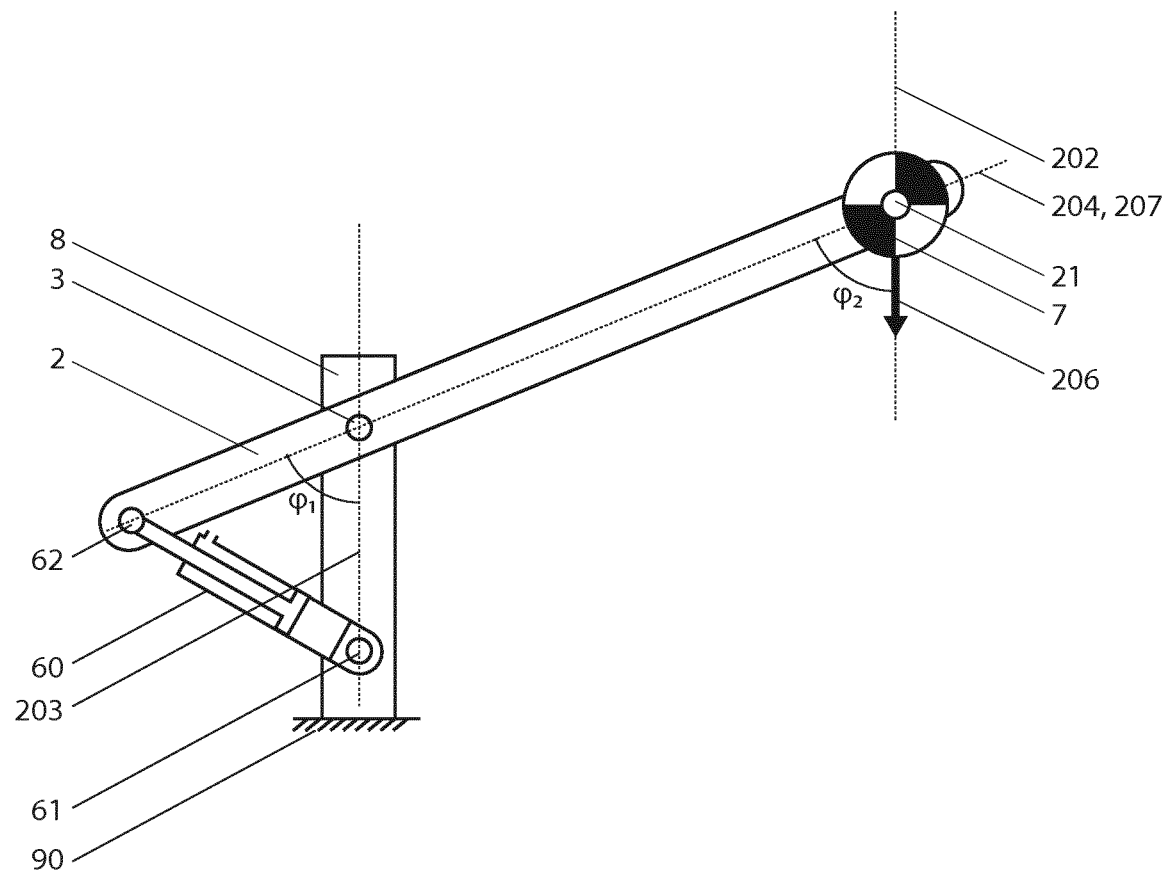

FIGS. 2a-c show a different embodiment, where lines 204 and 207 differ, and thus where lines 202 and 203 are not parallel. In effect however, since the angles $\psi_1$ and $\psi_2$ agree, the construction is equivalent to a construction in which the lines are parallel, as indicated by the dashed outline in FIG. 2a. As such lines 202 and 203 in FIG. 2a are said to be effectively parallel. In this embodiment point of application 62 is on first arm 2, albeit arm 2 is not straight.

In embodiments the gas or hydro-pneumatic spring 60 can be mounted such that the second point of application 62 lies between the pivot point 3 and the load engagement point 21, as shown in FIG. 1. It can also be mounted in such a way that the pivot point 3 lies between the second point of application 62 and the load engagement point 21, as shown in FIG. 2c. In either case care should be taken that the device is configured such that a pulling force of the device results in a lifting force on the load.

In embodiments the load 7, the gas or hydro-pneumatic spring 60 and/or the actuator 9 are directly connected to first arm 2. In other embodiments at least one of the load 7, the gas or hydro-pneumatic spring 60 and/or the actuator 9 are indirectly engaging the first arm 2 and/or the reference 90/support or frame 8.

Similar to the embodiment of FIG. 1, a wire 76 can connect load 7 to first arm 2, changing the direction of the applied force. In embodiments at least one flexible member/chain/wire/rope 76 and at least one pulley 76 connects the load/gas or hydro-pneumatic spring 60 or actuator 9 to the first arm 2. In other embodiments the load 7 might rest on first arm 2 (FIG. 2a), hang from the arm (FIG. 2b) or be part of the arm (FIG. 2c).

Non-Parallel Embodiments

In embodiments the (virtual) line 203 is neither parallel nor effectively parallel to (virtual) line 202. This can be the case, in the example of FIG. 1, when wheel 77 is not at infinite distance of the load engagement point 21 In such embodiments the trigonometric relations are still valid. The non-parallelism introduces a phase in the relationships.

A situation where lines 202 and 203 are not effectively parallel can also be realized accidentally as a consequence of normal operation procedure (e.g. by pitching or rolling motions of a ship on which the apparatus 1 is positioned). The failure of maintaining effective parallelism throughout the operation procedure can be resolved in different ways, one of which is illustrated by the embodiment of FIG. 3.

Figure 3:
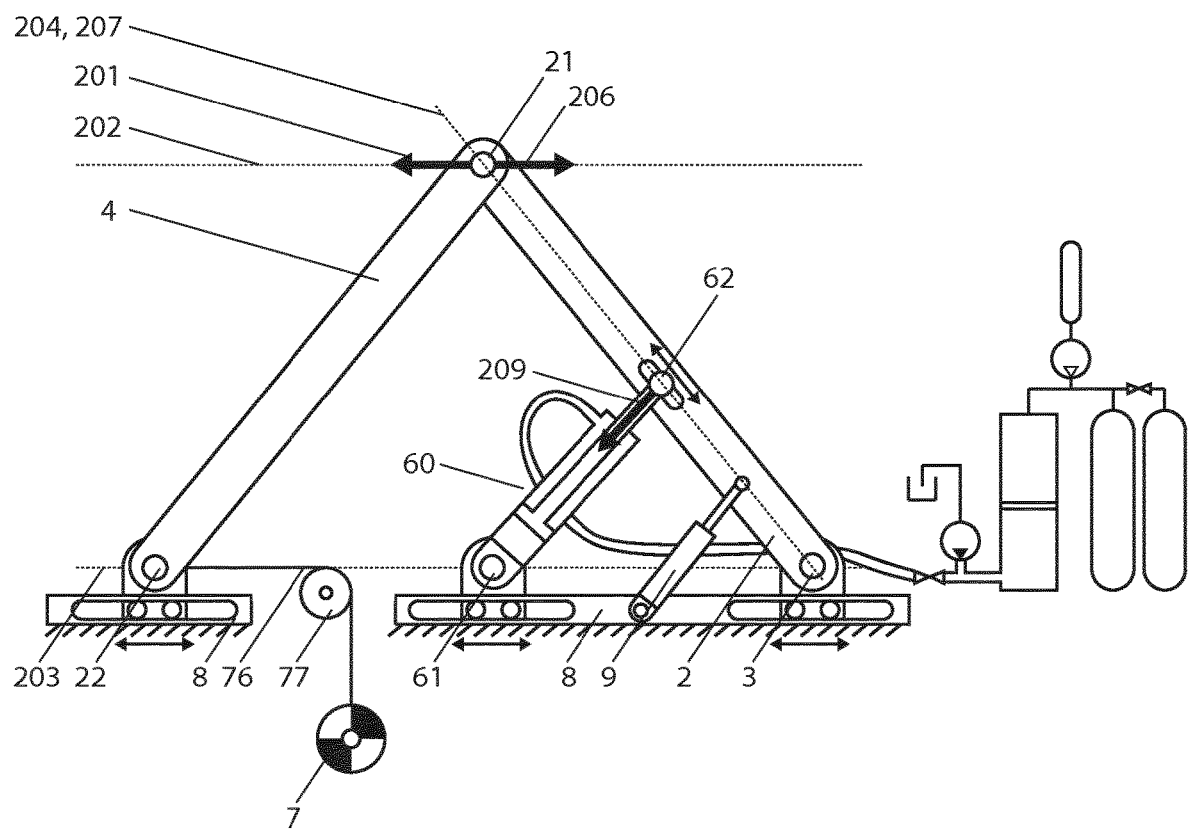
FIG. 3 shows a perspective view of another embodiment of the apparatus according to an aspect of the invention.

In the embodiment of FIG. 3 the apparatus contains a secondary arm 4 that is pivotably connected to first arm 2 in the point 21 and pivotably connected at a point 22 to the support or frame 8 in such a way that it can slide along the support frame parallel to the line 203. In the depicted embodiment a load 7 is connected to the arm 4 through a cable 76 over a pulley system 77. The load engages the first arm 2 indirectly, through the cable 76 and arm 4, at the load engagement point 21 in such a way that the indirect load force 206 and the compensation force 206 are along a line 202 that is parallel to line 203.

Analysis of the non-parallel between the lines has shown it can be engaged to counteract the non-linearity of the gas or hydro-pneumatic spring. The non-parallel between the lines can be realized by design in two ways: with a constant phase $\psi_0$ and a variable phase $\psi_3$ which varies as the arm moves from the first state to the second state. A constant phase $\psi_0$ can be realized by positioning the second point of application translated by a certain angle to line 202 without positioning the first point of application translated over the same angle. In the constant non-parallel case, the area of the triangle is proportional to the following formula:

$$\sin(\psi_2+\psi_0),$$

wherein $\psi_0$ is a non-zero phase term such as a non-zero constant. The variable non-parallel case can be realized by engaging the load force on the arm through a pulley or wheel located at a non-infinite distance of the arm. In the variable non-parallel case, the area of the triangle is substantially proportional to the following formula:

$$m \cdot g \cdot L \cdot (\cos \psi_3 + \tan \psi_2 \cdot \sin \psi_3)$$

In this formula $\psi_3$ is dependent on $\psi_1$. Surprisingly, the introduction of one or both of these phase terms allows the force extension curve of the gas or hydro-pneumatic spring (e.g. as shown in FIG. 4) to achieve a better balance. As explained above, the torque is proportional to $\sin \psi_2$. According to aspects of the invention the counter-torque may optionally also be correlated to a fixed phase term $\psi_0$ and a variable phase term, which terms in effect counteract the non-linearity of the gas or hydro-pneumatic spring, resulting in an even better balance. It is not possible to use a linear force extension (as in the case of ideal spring) to balance the torque and counter-torque. Instead, a non-linear force extension which does not comply the Hook's law is needed, and the gas or hydro-pneumatic spring turns out to be a suitable tool to provide substantial balance even with such a non-linear force extension.

Control Device

In embodiments the control device comprises one or more of:
  connections to a power supply. The power is used to connect to at least one of the following sensors and actuators;
  a sensor for the position and/or orientation of the mounting structure 8 and/or an actuator for controlling the position and/or orientation of the mounting structure 8 with respect to a reference;
  a sensor for measuring a force on the pivot point 3 and/or an actuator for controlling the position of the pivot point 3;
  a sensor for measuring the force of the actuator 9 and/or an actuator for controlling the position of one or more points of applications of the actuator 9;
  a sensor for measuring the force at the first point of application 61 or the second point of application 62 of the gas spring/hydro-pneumatic spring 60 and/or an actuator controlling the position of the first point of application 61 or the second point of application 62 of the gas spring/hydro-pneumatic spring 60;
  a sensor 86 for measuring the pressure in the gas volume and/or the position of the piston 65;
  a sensor for measuring a pressure of fluid in a fluid reservoir and/or an actuator for controlling a valve to allow a flow of fluid in or out of the fluid volume of the gas spring and/or hydro-pneumatic spring;
  one or more connection lines to the active torque providers, including driving devices for moving a point of application 61,62 or extending arm 2, to configure the active torque providers.

Offshore Application

Figure 5:
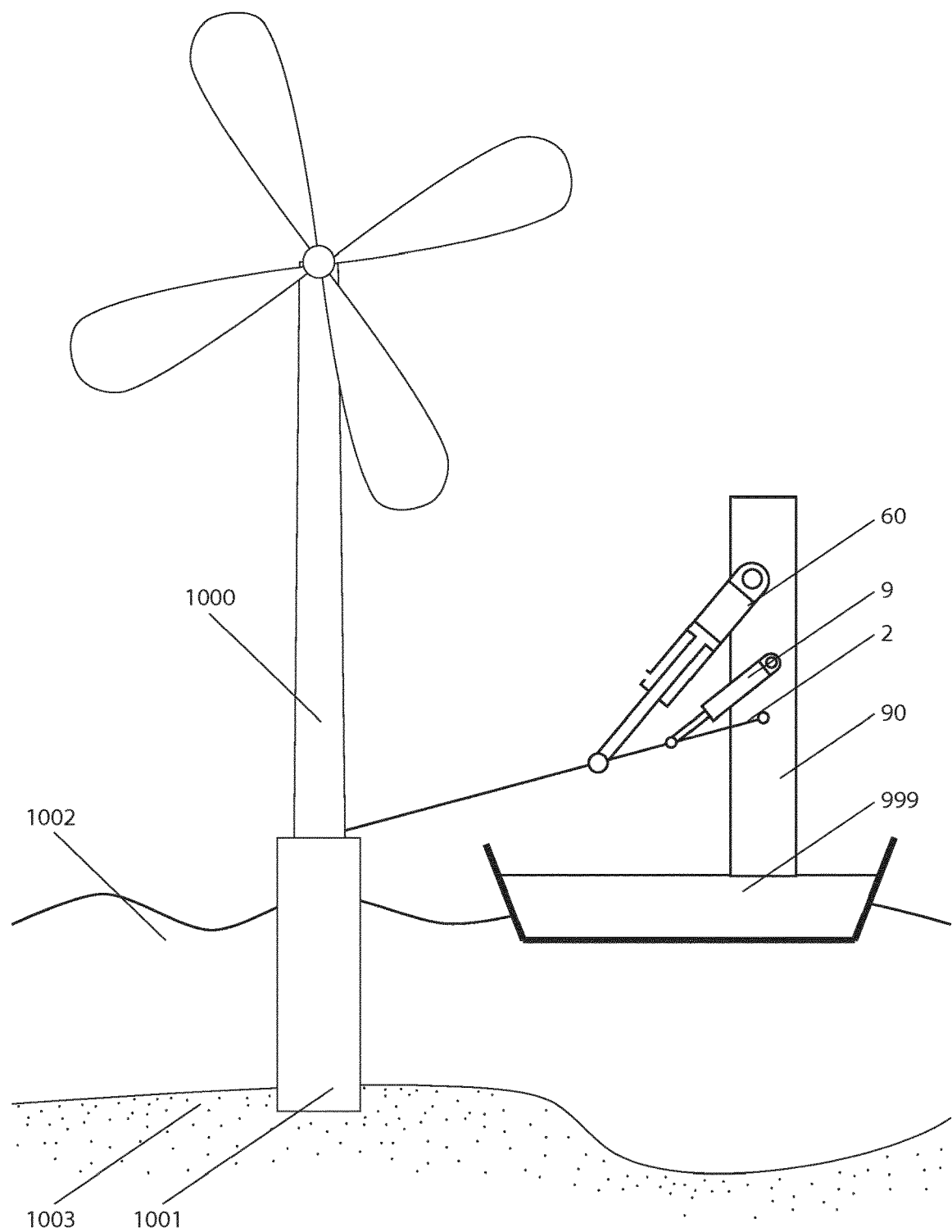
FIG. 5 shows an embodiment for use in off-shore application.

FIG. 5 shows, very schematically, a ship 999 in water 1002 above the sea bottom 1003. A rigid base structure 1001 was put in place in the sea bottom 1003. A wind turbine 1000 of at least 1000 Kg is supported by first arm 2 that is pivotably connected to support 90. The arm+wind turbine result in a torque. A significant part of the counter-torque is provided by a gas or hydro-pneumatic spring 90. Further an actuator 9 is there to balance the lifting and/or to move the arm with respect to the ship 999. Clearly other arrangements are possible. E.g. the apparatus of the invention can be on-shore, while the load is to be lifted or put on an off-shore vessel.

Embodiments of the invention include one or more features of embodiments disclosed in WO2007/034096. Any of the disclosed features can be combined with any of the features of WO2007/034096.

In embodiments the direction of the load force is correlated to the state of the arm, preferably by exerting the load force on the arm through a pulley 77 located at a distance of the arm so that ψ2 is correlated to state of the arm and the direction of the load force, so that ψ1 and ψ2 are not equal at different states of the arm, wherein preferably the difference between ψ1 and ψ2, ψ3 is a phase within a range between −15 degree and 15 degree, and wherein preferably the phase ψ3 is a non-zero variable.

In embodiments, ψ1 is an angle between the first arm (2) and the effective virtual line between the pivot point (3) and the second point of application (61) and wherein ψ2 is an angle between the first arm (2) and the load force and wherein ψ1 and ψ2 are substantially equal in any state of the arm In embodiments, ψ1 is an angle between the first arm (2) and the effective virtual line between the pivot point (3) and the second point of application (61) and wherein ψ2 is an angle between the first arm (2) and the load force and wherein the difference between ψ1 and ψ2 substantially is within +/−30 degrees in any state of the arm.

The invention claimed is:

1. An apparatus, comprising:
a first arm that is arranged to rotate about a pivot point from a first state to a second state by at least by 10 degrees, wherein the first arm is arranged to carry a load force, resulting in a torque dependent on the load and the first arm with respect to the pivot point,
a gas spring or hydro-pneumatic spring arranged to apply a force on the arm, resulting in a counter-torque with respect to the pivot point, and
an actuator for providing an additional torque or counter-torque,
wherein the gas spring or hydro-pneumatic spring has adjustable spring characteristics and
wherein the gas spring or hydro-pneumatic spring is configured to compensate at least 50% of the torque with the counter-torque in the first state and in the second state,
further comprising a support or frame, wherein the gas or hydro-pneumatic spring is arranged to apply the force at a first point of application on the first arm, and a second point of application on the support or frame,
wherein the pivot point, the first point of application and the second point of application define a triangle having an area correlated with the torque and/or the counter-torque.

2. The apparatus according to claim 1, wherein
an angle ψ between an effective virtual line through the pivot point and the second point of application and the direction of the load force is between +/−30 degrees at first and second state of the arm; and/or
the first point of application is located substantially on an effective virtual line between the arm pivot, the point of application of the load force on the arm.

3. The apparatus according to claim 1, wherein
the area of the triangle is proportional to the following formula:

$$\sin(\psi 2+\psi 0),$$

wherein ψ2 is an angle between the first arm and the load force, and ψ0 is a phase within a range between −15 degree and 15 degree.

4. The apparatus according to claim 1, wherein the spring characteristic of the gas or hydro-pneumatic spring is adapted to compensate at least 70% of the torque in the first state and second state.

5. The apparatus according to claim 1, wherein the gas spring or hydro-pneumatic spring is configured to provide counter-torque balanced with the torques of the arm and load, the actuator providing zero torque, in the first state.

6. The apparatus according to claim 1, wherein the apparatus comprises a control device for configuring the spring characteristic of the gas or hydro-pneumatic spring or is arranged to receive inputs from a control device.

7. The apparatus according to claim 1, wherein one or more positions of points of applications of the actuator and/or gas-spring are adjustable and wherein a control device is arranged to configure the position of one or more points of application.

8. The apparatus according to claim 1, wherein the apparatus further comprises a central control unit for calculating, using an algorithm, a balancing force to be exerted by the actuator in dependence on the spring characteristic of the gas or hydro-pneumatic spring.

9. The apparatus according to claim 1, wherein first arm (2) comprises a telescopic arrangement for changing a distance of the load force to the pivot point (3); and/or the apparatus further comprises a second arm (4) connected to the first arm (2) at a hinge, wherein the hinge moves along a predetermined direction when the second arm (4) moves.

10. The apparatus according to claim 1, wherein a gas volume, a surface of the piston, a distance between the pivot point and the first point of application and a distance between the pivot point and the second point of application are correlated.

11. A method for configuring an apparatus for moving a load or maintaining a position of a load, the method comprising:
providing a support or frame having a pivot point and a first arm that can rotate about the pivot point by at least 10 degrees,
providing a gas or hydro-pneumatic spring for applying a force at a first point of application on the first arm, and at a second point of application on the support or frame;
providing an actuator for providing an additional torque or counter-torque,
providing a load force on the first arm,
configuring spring characteristics of the gas or hydro-pneumatic spring to provide a counter-torque of at least 50% of the torque provided by the load force at a first angle and at a second angle, that is at least 10 degrees different from the first angle.

12. The method according to claim 11, further comprising adjusting the spring characteristics of the gas or hydro-pneumatic spring and/or adjusting one or more positions of applications during operation.

13. The method according to claim 11, further comprising calculating, using an algorithm, a balancing force to be exerted by the actuator in dependence on the spring characteristic of the gas or hydro-pneumatic spring.

14. The apparatus according to claim 1, wherein:

the support or frame supporting, directly or indirectly, an application point of the gas spring or the hydro-pneumatic spring and an application point of the actuator, the arm, pivot point, the support/frame and the gas spring or hydro-pneumatic spring are arranged in a system having a spring-balance configuration; and/or the first arm is arranged to rotate about a pivot point from a first state to another state by at least 15 degrees; and/or the gas or hydro-pneumatic spring is configured to compensate at least 60% of the torque with the counter-torque in the first state and in the second state; and/or any combination of angle and percentage disclosed above; and/or the gas spring or hydro-pneumatic spring is arranged as a pulling device, connected to the first arm directly or indirectly; and/or the gas or hydro-pneumatic spring is arranged to apply the force at a first point of application on the first arm, and a second point of application on the support or frame, having a first angle ($\psi 1$) opposite the gas spring or hydro-pneumatic spring at the pivot point, wherein a second angle is defined between the load force and the pivot point at a load force application point, wherein the first and second angle are at most 30 degrees different.

* * * * *